United States Patent [19]

Lüder et al.

[11] Patent Number: 4,523,223
[45] Date of Patent: Jun. 11, 1985

[54] METHOD AND APPARATUS FOR CONTROLLING THE DIGITAL CHROMINANCE SIGNALS OF A COLOR TELEVISION RECEIVER

[75] Inventors: Rainer Lüder, Oberhaching; Wolfgang Haussmann, Munich, both of Fed. Rep. of Germany

[73] Assignee: Siemens Aktiengesellschaft, Berlin and Munich, Fed. Rep. of Germany

[21] Appl. No.: 383,265

[22] Filed: May 28, 1982

[30] Foreign Application Priority Data

Jun. 10, 1981 [DE] Fed. Rep. of Germany ....... 3123038

[51] Int. Cl.³ .......................................... H04N 9/535
[52] U.S. Cl. ...................................... 358/27; 358/40
[58] Field of Search .................. 358/21 R, 25, 27, 40, 358/169

[56] References Cited

U.S. PATENT DOCUMENTS 4,092,667  5/1978  Akazawa ............................... 358/27
4,356,506 10/1982  Yamamitsu ........................... 358/40
4,398,209  8/1983  Robitzsch ............................. 358/27

Primary Examiner—Michael A. Masinick
Attorney, Agent, or Firm—Herbert L. Lerner; Laurence A. Greenberg

[57] ABSTRACT

Method for controlling the digital chrominance signal of a color television receiver depending upon the amplitude of the burst signal and color contrast, which includes multiplying the digital chrominance signal and the burst signal in a multiplier with a given coefficient, forming a mean value of the burst amplitude from an output signal of the multiplier, comparing the mean value of the burst amplitude with a nominal value corresponding to a desired color contrast setting, and changing the given coefficient corresponding to the result of the comparison, and an apparatus for carrying out the method.

8 Claims, 2 Drawing Figures

METHOD AND APPARATUS FOR CONTROLLING THE DIGITAL CHROMINANCE SIGNALS OF A COLOR TELEVISION RECEIVER

BACKGROUND AND FIELD OF THE INVENTION

The invention relates to a method and an apparatus for controlling the digital chrominance signal of a color television receiver in dependence upon the burst signal amplitude and the color contrast.

PRIOR ART

In a digital color decoder, the FBAS-signal (color picture scan synchronization), which may be digitized by an A/D converter, is divided into a chrominance signal also called color difference signal (color hue and saturation) and a luminance signal (brightness signal). The function of regulating the amplification of the chrominance signals must be exclusively effected by digital circuitry. Accordingly, the amplitude of the burst signal (burst reference signal or color synchronizing signal) is to be used as the reference value. In order to influence the color contrast, it is also necessary to make the amplification adjustable.

A possible digital solution could possibly be conceived, wherein a first multiplier is provided, having a multiplication coefficient which is changed by an amplification control, whereby the coefficient is influenced by the amplitude of the burst signal. Then, a second multiplier would be provided, having a coefficient which can be adjusted corresponding to the desired color contrast. The disadvantage of such a solution lies in the considerable complexity of two series-connected multipliers, which operate with a great power loss due to their high word rate, and require a large area in an integrated circuit.

It is accordingly an object of the invention to provide a method and apparatus for controlling the digital chrominance signals of a color television receiver, which overcomes the hereinafore-mentioned disadvantages of the heretofore-known methods and devices of this general type, and which can be provided in an integrated circuit with a small area requirement, a low power loss, and very economically.

With the foregoing and other objects in view there is provided, in accordance with the invention, a method for controlling the digital chrominance signal of a color television receiver depending upon the amplitude of the burst signal and color contrast, which comprises multiplying the digital chrominance signal and the burst signal in a multiplier with a given coefficient, forming a mean value of the burst amplitude from an output signal of the multiplier, comparing the mean value of the burst amplitude with a nominal value corresponding to a desired color contrast setting, and changing the given coefficient corresponding to the result of the comparison. In this manner, it is possible to operate with only one multiplier, which simultaneously serves to adjust the color saturation and the color contrast, respectively, and which amplifies the burst amplitude and the chrominance signals, respectively, to a nominal value in order to equalize tuning-dependent variations.

SUMMARY OF THE INVENTION

To reduce the effective color saturation at strong noise conditions, in accordance with another mode of the invention, there is provided a method which comprises performing the comparison by forming the mean value of the values of the burst amplitude and comparing the mean value with the nominal value corresponding to the desired color contrast setting.

To reduce the cost of the hardware, in accordance with a further mode of the invention, there is provided a method which comprises forming individual color difference signals of the chrominance signal, and feeding the individual color difference signals to the multiplier in a time multiplexing scheme.

In accordance with the device for performing the method, there is provided an apparatus for carrying out a method for controlling the digital chrominance signal of a color television receiver depending upon the amplitude of the burst signal and color contrast, comprising a multiplier having an input side receiving the digital chrominance signals and the burst signals, another input and an output, a mean value generator having an input connected to the output of the multiplier for receiving signals therefrom during a given burst time and having an output, a comparator having a first input connected to the output of the mean value generator, a second input and an output, means connected to the second input of the comparator for supplying a nominal value corresponding to the desired color contrast setting, and a counter having a content corresponding to a given coefficient and having an input connected to the output of the comparator and an output connected to the other input of the multiplier.

In accordance with an added feature of the invention, the mean value is formed by a register being synchronized with a given burst time and having an input connected to the output of the multiplier and an output an adder having a first input connected to the output of the register, a second input and an output, and an intermediate register having an output connected to the second input of the adder and an input connected to the output of the adder, the output of the adder being additionally connected to the first input of the comparator.

In accordance with an additional feature of the invention, there is provided a plurality of EXOR gates connected between the register synchronized to the burst time and the first input of the adder.

In accordance with again another feature of the invention, the multiplier operates according to the pipeline principle.

In accordance with a concomitant feature of the invention, there is provided a limiter being connected to the output of the multiplier and the input of the mean value generator for feeding a regulated chrominance signal.

Other features which are considered as characteristic for the invention are set forth in the appended claims.

Although the invention is illustrated and described herein as embodied in a method and apparatus for controlling the digital chrominance signals of a color television receiver, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings, in which.

DESCRIPTION OF THE PREFERRED EMBODIMENTS

Figure 1:
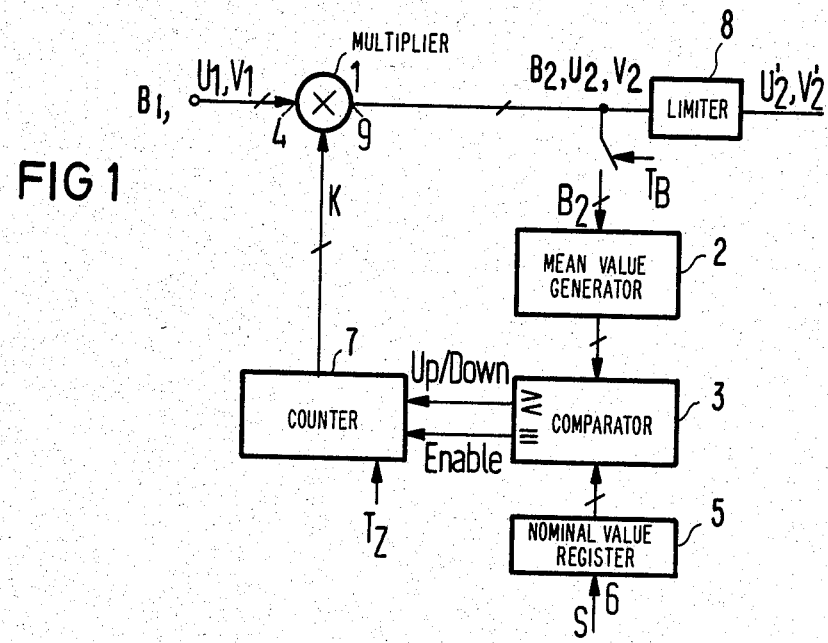
FIGS. 1 and 2 are schematic block circuit diagrams of two embodiments of an apparatus for performing the method according to the invention.

Referring now to the figures of the drawing and first particularly to FIG. 1 thereof, there is seen a multiplier 1 which performs both functions of the invention together, i.e. the control of the chrominance amplification and the adjustment of the color contrast. Preferably, the scan values of the demodulated color difference signals $U_1$ and $V_1$ in multiplexed form are applied to a data input 4 of the multiplier 1. However, it is also possible to apply modulated color difference signals $F_U$ and $F_V$ at the data input 4, and to perform their demodulation in a later processing step. If the color difference signals are not multiplexed, the apparatus according to the invention must be separately provided for each color difference signal.

The multiplication of the demodulated color difference signals $U_1$ and $V_1$ at the data input 4 with a coefficient $K^* = K \cdot 2^{-n}$ furnishes the starting color difference signals $U_2$ and $V_2$, wherein K is positive and an integer, and the factor $2^{-n}$ serves as a scale factor, and can be provided in a simple way, such as by omitting or not processing, respectively, the lowest valued n bit places of the output signal 9.

A demodulated burst signal $B_1$ is also multiplied and amplified, respectively, with the coefficient $K^*$. An amplified burst signal $B_2$ is fed to the input of a mean value generator 2 during the burst time, i.e. during the time in which the burst signal occurs, and its mean value is formed in the mean value generator through the duration of a burst time $T_B$. For example, this can be done in a simple way by taking the measure of not determining the arithmetic mean of the amplitudes of the burst signal $B_2$, but by simply summing the individual scan values of the amplitude of the signal $B_2$ through the burst time $T_B$.

The nominal value for the actual desired color contrast setting 6 is stored in a nominal value register 5. In this connection, for example, not only the color saturation, but a connection of color saturation and brightness contrast should be understood under the term color contrast. This connection can be, for example, multiplicative or additive.

In a comparator 3, having a first input being connected to an output of the mean value generator 2, and a second input being connected to the output of the nominal value register 5, the mean value for the burst signal $B_2$ is compared with a nominal value S stored in the nominal value register 5. The mean value is, for example, determined in the mean value generator 2 after each line period.

The output of the comparator 3 is connected to a counter 7 which contains the actual value of the coefficient K. If $B_2 > S$, the coefficient K is raised by 1. If $B_2 < S$, then K is diminished by 1. If $B_2$ and S are equal, the coefficient K remains unchanged. Therefore, the regulation is adjusted when $B_2 = S$. In this way, it is possible to hold the color difference signals $U_2$ and $V_2$ at the output of the multiplier 1 at a certain level independent of the input signal $U_1$ and $V_1$, and to thereby provide the function to control the chroma or color amplification.

If the nominal value S is changed, the level of the color difference signals $U_2$ and $V_2$ can be changed. Thus, the color contrast can be changed by a change of the digital nominal value. Since the coefficient K is dependent upon the color contrast, as well as upon the level of the input burst amplitude $B_1$, only one multiplier 1 is required for both functions. A further advantage of the method according to the invention lies in the fact that the coefficient K which is necessarily limited by the word width of the counter 7 (with an 8 bit width, K can assume values between 0 and 255, for example), can be distributed in any chosen way between chrominance amplification and color contrast adjustment.

In the control apparatus according to the invention, wherein the mean value of the burst amplitude $B_2$ is formed during the burst period, and this mean value is compared with the nominal value S, by the change of K about $\pm 1$, the expenditure for the control circuit is small.

In order to reduce the effect of noise with small input signals $U_1$ and $V_1$, at high noise levels, or at the occurence of other interference factors, and to prevent overdriving the following stages of the apparatus according to the invention, it is advantageous to connect a limiter 8 between the apparatus according to the invention and the next processing stage, this limiter cutting off output amplitudes lying above a desired limit.

Figure 2:
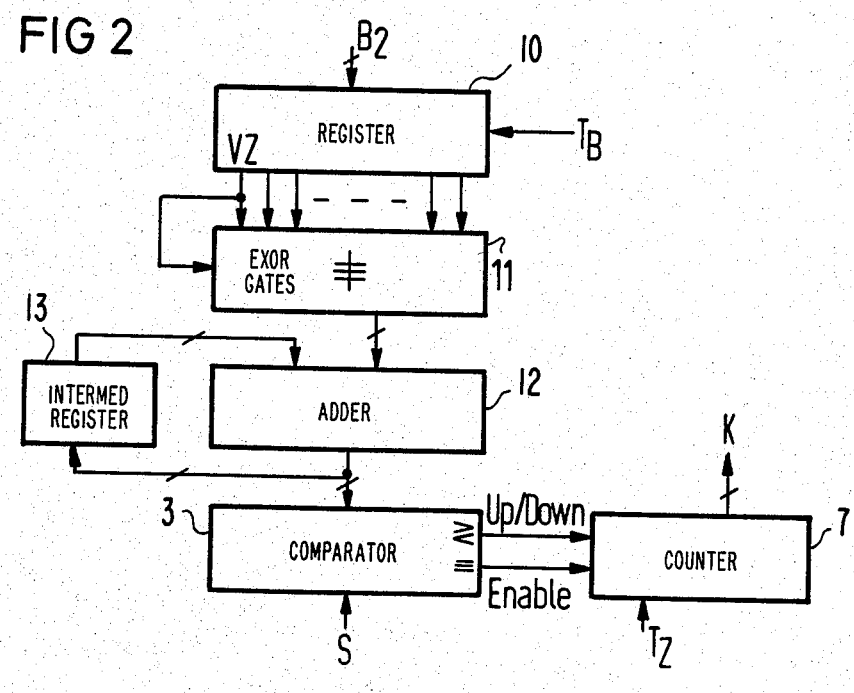

FIG. 2 shows a further development of the apparatus according to the invention, and a typical embodiment for a mean value generator which can be utilized in the apparatus according to the invention. In the apparatus according to the invention shown in FIG. 2, the mean value of the burst amplitude values $B_2$ is formed. The noise portions in the signal are therefore quasi rectified, and add themselves to the burst signal. In this manner, the effective color saturation is reduced even with strong noise, because the actual mean burst amplitude is smaller than the mean value which is compared with the nominal value S. This reduction of the color saturation in a picture with noise is subjective, i.e. it is an advantage for the television viewer.

FIG. 2 shows an embodiment of the control circuit according to the explanations given above, with means for forming the mean for the values of the burst amplitudes. The demodulated scan values of the burst signal are first stored in a register 10. This can be effected in such a way that the register 10 is coupled at the input side thereof with the output 9 of the multiplier 1, and is synchronized by a pulse (burst gate pulse) which is active only during the burst time $T_B$. A circuit component 11 shown in FIG. 2 is formed of exclusive OR-gates (EXOR gates) and forms a number from the burst values in the register 10 using the sign value VZ. This can be accomplished by the provision of each bit position of the register 10 being admitted to the first input of one of the EXOR gates, having a second input being supplied with the respective bit position of the sign-bit VZ. The outputs of the EXOR gates, and of the component 11, respectively, are connected to the first input of an adder 12, which therefore only receives the amount of the values from the register 10.

The adder 12 which is, for example, constructed as a full adder, sums the scan values of the burst amplitude $B_2$, and stores the intermediate results in an intermediate result register 13. The input of the register 13 is connected to the output of the adder 12, and the output of the register 13 is connected to the second input of the adder 12. By omitting the last bit places (by neglecting the least significant bits) of the adder 12, it is possible to adjust or scale the result. After the result is processed, it is returned to the intermediate result register 13. The result of the mean values thus formed, which lies at the output terminal of the adder 12, is conducted to the comparator 3, which compares the result with the nominal value S. The counter 7 is controlled, as in the embodiment according to FIG. 1, by the result of this comparison (actual>nominal, actual<nominal, actual=nominal). Then the count of the counter 7 controls the amplification of the multiplier as the coefficient K.

The time required for the setting depends upon whether the coefficient K in the counter 7 changes after every line, after every $n^{th}$ line, or after each picture change by ±1. It is advantageous to adjust the coefficient K so that it can change, for example, after each line, i.e. with the horizontal frequency. This can be effected by synchronizing the counter 7 with the horizontal frequency, while taking care that the synchronizing pulse is activated after the end of the burst gate pulses and considering the response time of these gates.

If the color difference signals (chrominance signals) $U_1$ and $V_1$ from the FBAS signal are scanned with a scan frequency corresponding to the doubled color carrier frequency, i.e. for the example of the PAL standard with 8.867 MHz (spacing between $U_1$ words and $V_1$ words being 112 nsec), the multiplier 1, the register 10 and the intermediate register 13 can be synchronized with the same frequency.

The mean value generator 2 in the embodiment according to FIG. 1 can be constructed similarly to the apparatus according to FIG. 2, including the register 10, the adder 12 and the intermediate register 13, and omitting the circuit component 11. A conventional commercial up-down counter can be used for the counter 7.

If a word width of 8 bits is used for the chrominance signals, all components used can also have a width of 8 bits.

Because multipliers in digital processes belong to a group of functions having the greatest area requirement, it is important to construct the multiplier 1 with a minimum area requirement. It is advantageous to use a "pipeline multiplier" working on the "pipeline principle" which, for example, is known from the publication by C. Mead and L. Conway, entitled "Introduction to VLSI Systems", Reading, Mass.: Addison Wesley, 1980, especially page 76. This type of multiplier is based on the principle of successive addition with place value shifting and intermediate storage of partial results and the multiplicator. After sampling the multiplicant and multiplicator the result is not available after a few gate transit times, but only after a time n·T, wherein n represents the number of addition cycles and T the cycle period. The disadvantage of the increased delay time n·T causes no problems, because only the group transit time of the processor is increased, while the hardware requirement is considerably less compared to conventional multipliers. By omitting or by not processing, respectively, the least significant bit places in the partial result, the scaling or adjustment of the factor K to the multiplication factor K* is made possible in a simple way.

The method according to the invention can be especially applied to color television systems with the PAL standard and the NTSC standard.

The foregoing is a description corresponding to German Application No. P 31 23 038.5, dated June 10, 1981, the International priority of which is being claimed for the instant application, and which is hereby made part of this application. Any discrepancies between the foregoing specification and the corresponding German application are to be resolved in favor of the latter.

We claim:

1. Method for forming and controlling the digital chrominance signals of a color television receiver depending upon the amplitude of the color burst signal, which comprises multiplying the digital chrominance signal and the color burst signal by a coefficient in a multiplier, forming a mean value of the color burst amplitude of the burst signal from an output signal of the multiplier, comparing the mean value of the burst amplitude with a nominal value corresponding to a desired color contrast setting thereby producing said coefficient.

2. Method according to claim 1, which comprises performing the comparison by forming the mean value of the values of the burst amplitude and comparing the mean value with the nominal value corresponding to the desired color contrast setting.

3. Method according to claim 1, which further comprises forming individual chrominance signals, and feeding the individual chrominance signals to the multiplier in a time multiplexing arrangement.

4. Apparatus for carrying out a method for controlling the digital chrominance signal of a color television receiver depending upon the amplitude of the color burst signal, comprising a multiplier having an input side receiving the digital chrominance signal and the burst signal, another input and an output, a mean value generator having an input responsive to the output of said multiplier for receiving signals therefrom during a given burst time and having an output, a comparator having a first input responsive to the output of said mean value generator, a second input and an output, means connected to the second input of said comparator for supplying a nominal value corresponding to the desired color contrast setting, and a counter having a content corresponding to a given coefficient and having an input responsive to the output of said comparator and an output operatively engaging the other input of said multiplier.

5. Apparatus according to claim 4, wherein said mean value generator is in the form of a register being synchronized with a given burst time and having an input responsive to the output of said multiplier during the burst time and an output, an adder having a first input responsive to the output of said register, a second input and an output, and an intermediate register having an output operatively engaging the second input of said adder and an input responsive to the output of said adder, said output of said adder additionally operatively engaging the first input of said comparator.

6. Apparatus according to claim 4, including a plurality of EXOR gates interposed between said register synchronized to the burst time and the first input of said adder for producing the exclusive OR-functions of the mean values in the register and transmitting them to the adder.

7. Apparatus according to claim 4, wherein said multiplier operates according to the pipeline principle.

8. Apparatus according to claim 4, including a limiter being responsive to the output of said multiplier for producing a limited chrominance signal.

* * * * *